(12) United States Patent
Pittman

(10) Patent No.: US 9,543,741 B1
(45) Date of Patent: Jan. 10, 2017

(54) TEMPORARY ATTACHMENT EQUIPOTENTIAL GROUNDING TOOL

(71) Applicant: Jeffrey A. Pittman, Lucasville, OH (US)

(72) Inventor: Jeffrey A. Pittman, Lucasville, OH (US)

(*) Notice: Subject to any disclaimer, the term of this patent is extended or adjusted under 35 U.S.C. 154(b) by 156 days.

(21) Appl. No.: 14/686,236

(22) Filed: Apr. 14, 2015

Related U.S. Application Data

(60) Provisional application No. 61/994,329, filed on May 16, 2014.

(51) Int. Cl.
*H02G 1/02* (2006.01)

(52) U.S. Cl.
CPC ...................... *H02G 1/02* (2013.01)

(58) Field of Classification Search
CPC ........ H02G 13/00; H02G 13/20; H02G 13/40; H02G 13/80; H02G 1/02; H01B 5/02
USPC .... 174/60, 135, 61, 6, 7, 40 CC, 51, 1, 5 R; 361/212, 216
See application file for complete search history.

(56) References Cited

U.S. PATENT DOCUMENTS

| | | | | |
|---|---|---|---|---|
| 2,270,325 A | * | 1/1942 | Matthews | H01R 4/66 111/99 |
| 2,449,313 A | * | 9/1948 | Naef | H01R 4/66 174/6 |
| 3,548,069 A | * | 12/1970 | Watanabe | H02G 13/40 174/7 |
| 3,619,773 A | * | 11/1971 | Lathrop | G01R 27/18 174/7 |
| 4,255,608 A | | 3/1981 | Bosch et al. | |
| 4,478,312 A | | 10/1984 | Kurtgis | |
| 6,963,026 B2 | * | 11/2005 | Brennan | H01R 4/66 174/3 |
| 2003/0011354 A1 | | 1/2003 | Daniel | |
| 2009/0130872 A1 | | 5/2009 | De France | |
| 2012/0007620 A1 | | 1/2012 | Nolletti | |

OTHER PUBLICATIONS http://www.transnet.co.nz/live-line-safety-equipment/temporary-grounding-equipment/1ea-equipotential-ss-t-bar-m12-110mm.
http://www.hubbellcatalog.com/hps/datasheet.asp?PN=T6002408 (Apr. 4, 2012).
http://www.hubbellcatalog.com/hps/datasheet.asp?PN=G3370 &FAM=personal_grounding_e (Mar. 4, 2002).
http://www.hubbellcatalog.com/hps/datasheet.asp?PN=T6002320 &FAM=personal_grounding_e (Feb. 21, 2002).
http://www.hubbellcatalog.com/hps/datasheet.asp?PN=C6002231 (Feb. 21, 2002).

* cited by examiner

*Primary Examiner* — Angel R Estrada
(74) *Attorney, Agent, or Firm* — Robert C. Montgomery; Montgomery Patent and Design, LP.

(57) ABSTRACT

An equipotential grounding tool adapted to provide a temporary grounding and bonding point for establishing an equipotential work area for electrical linemen. The tool has has a variety of attachment fastening means for securing the tool to a fixed point. Once secured the tool provides common grounding and bonding contact points for interconnecting the surrounding surfaces and/or devices.

16 Claims, 4 Drawing Sheets

TEMPORARY ATTACHMENT EQUIPOTENTIAL GROUNDING TOOL

RELATED APPLICATIONS

The present invention was first described in and claims the benefit of U.S. Provisional Application No. 61/994,329, filed May 16, 2014, the entire disclosures of which are incorporated herein by reference.

FIELD OF THE INVENTION

The present invention relates generally to an apparatus adapted to provide a temporary grounding and bonding point for establishing an equipotential work area for electrical linemen.

BACKGROUND OF THE INVENTION

As anyone who performs a great deal of physical work will attest, nothing beats having the proper tool for a job. The proper tool can save time, money, produce a higher quality work product, reduce equipment damage, and provide for increased worker safety. Each field of physical work has its own type of specialty tools, each of which performing a specialized task. One (1) such field is high voltage work in the electrical industry. As one can imagine, the risk of electrocution when working around live equipment is ever present and extremely high. To ensure workers' safety, it is paramount that all surfaces they touch, or are likely to come in contact with, are at the same potential or voltage. Also, the high voltage nature of nearby lines can induce dangerous voltages even in de-energized lines. In most cases, workers attach to nearby structures using spring clamps or bolt clamps to ensure there safety. However, often times these connections are not low resistance and in other cases are even non-existent, thus sacrificing worker safety. Accordingly, there exists a need for a means by which high reliability and low resistance grounding connections can be provided for equipotential grounding used in high voltage work. The use of the equipotential grounding tool provides enhanced grounding ability for workers performing maintenance or repair work around high voltage lines in a manner which is not only quick, easy, and effective, but vastly improves safety.

SUMMARY OF THE INVENTION

The inventors have recognized the aforementioned issues and inherent problems and observed that there is a lack in the prior art for a means to provide an equipotential grounding tool.

It is therefore an object of the invention to provide a tool comprising a shaft which has a first end, a tee-shaft attached at a center to the first end and extending perpendicularly therefrom, and an attachment region at a second end opposite the first end. The tool also comprises a shaft stop located at and circumscribing an outer diameter of the shaft at an intermediate position and a plurality of first flat features circumscribing the outer diameter of the shaft between the shaft stop and the tee-shaft. The attachment region is configured to removably receive a fastening feature. The tee-shaft is an integral portion of the shaft. The tee-shaft further comprises integral disc-shaped attachment keepers at both distal ends, each extending perpendicularly outward therefrom. The attachment keepers are adapted to safely retain grounding and bonding lines.

The attachment region may either be a male threaded fastener and a female threaded fastener and a plurality of second flat features, or a male threaded fastener or a spiked end having a male threaded region.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
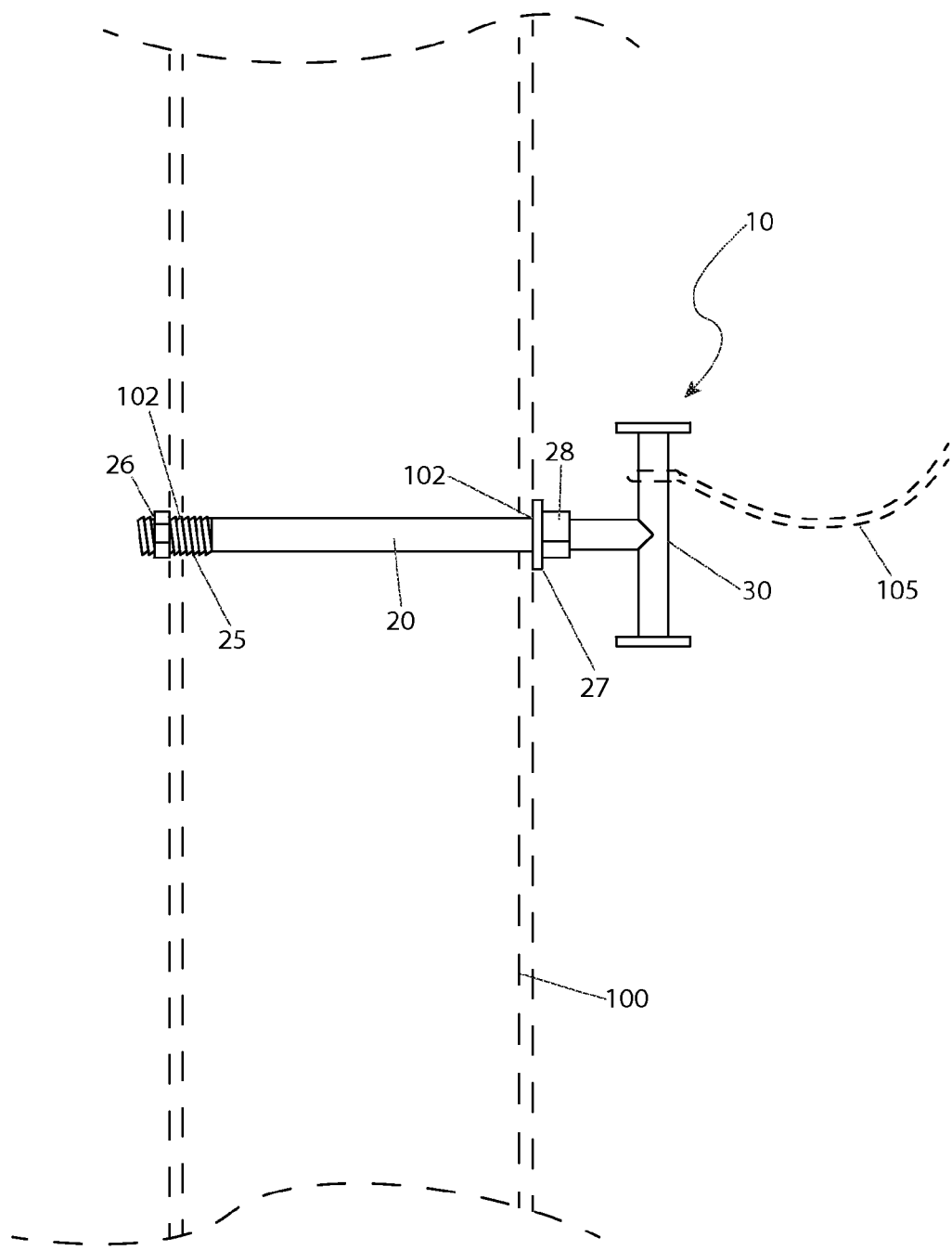
FIG. 1 is an environmental view of an equipotential grounding device 10 depicting installation upon a power pole 100, according to a preferred embodiment of the present invention.

10 equipotential grounding device
20 shaft
22 'd' dimension
25 male threaded region
26 nut fastener
27 shaft stop
28 wrench flats
30 tee-shaft
32 attachment cable keeper
100 power pole
102 aperture
103 male threaded fastener
105 grounding/bonding line
110 wooden pole
200 first alternate embodiment
220 first alternate shaft
227 female threaded region
300 second alternate embodiment
320 second alternate shaft
322 spike end
325 alternate male threaded region

DETAILED DESCRIPTION OF THE PREFERRED EMBODIMENT

Figure 2:
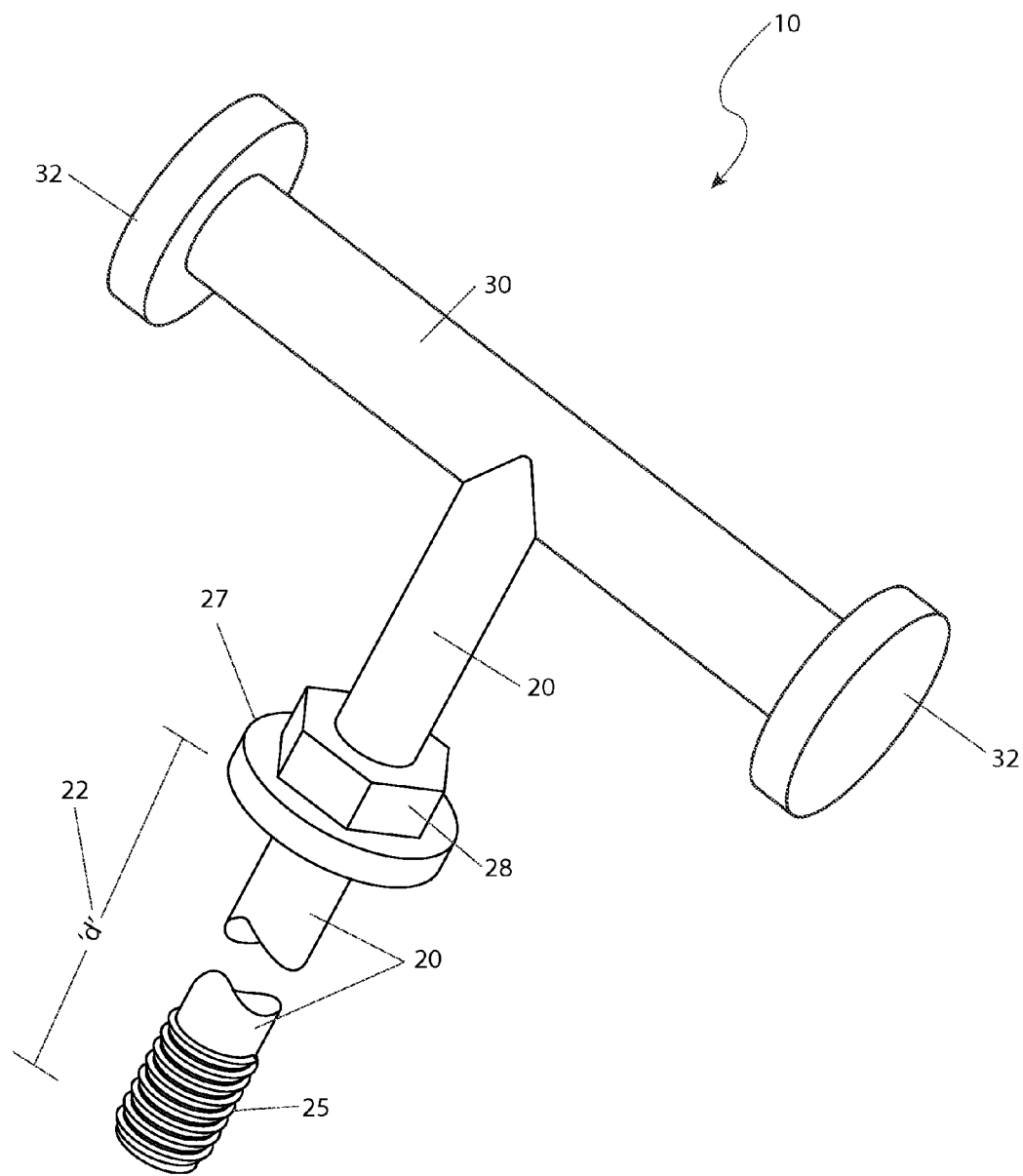
FIG. 2 is a perspective view of the equipotential grounding device 10, according to a preferred embodiment of the present invention.
Figure 3:
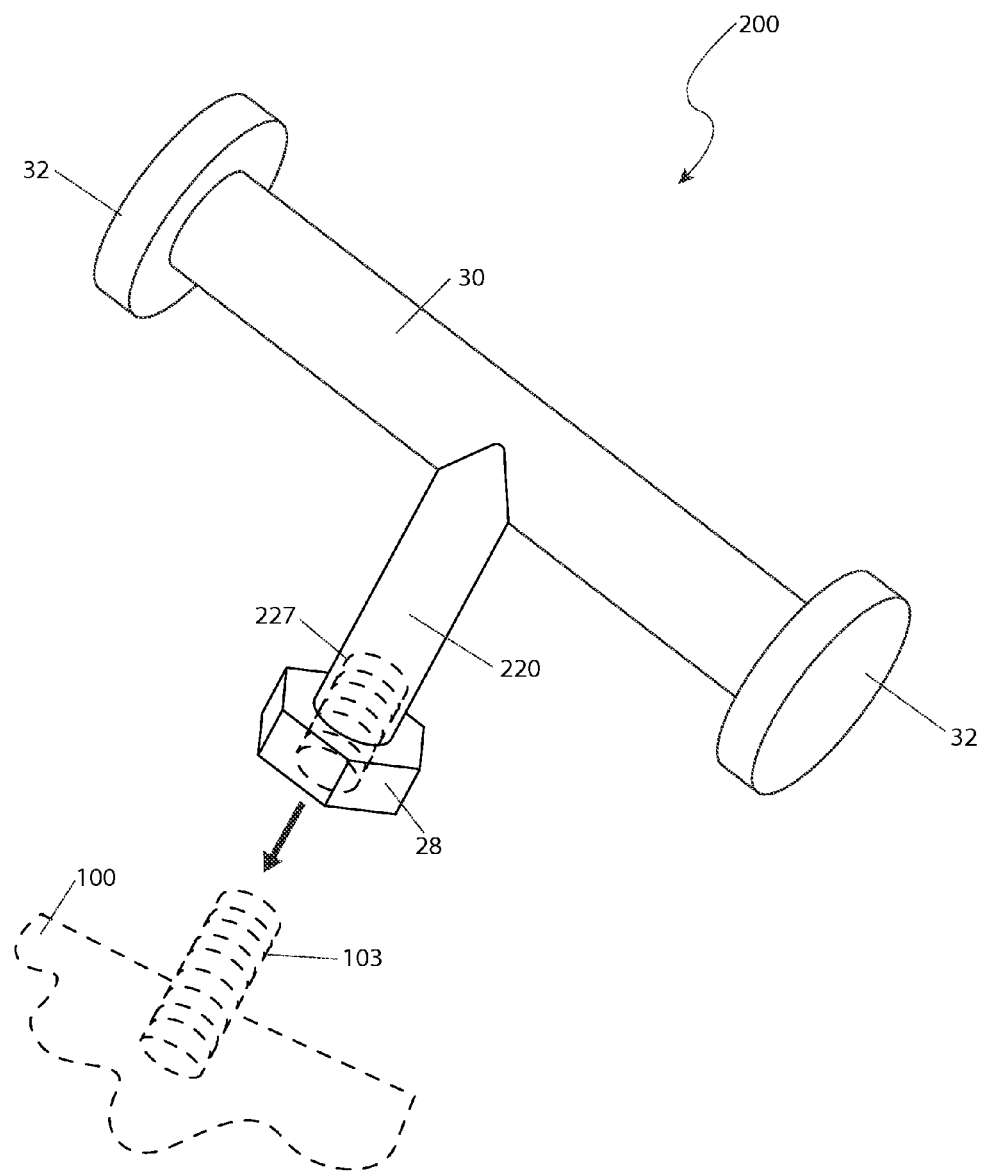
FIG. 3 is a perspective view of a first alternate embodiment 200 of the present invention; and, FIG. 4 is a perspective view of a second alternate embodiment 300 of the present invention.
Figure 4:
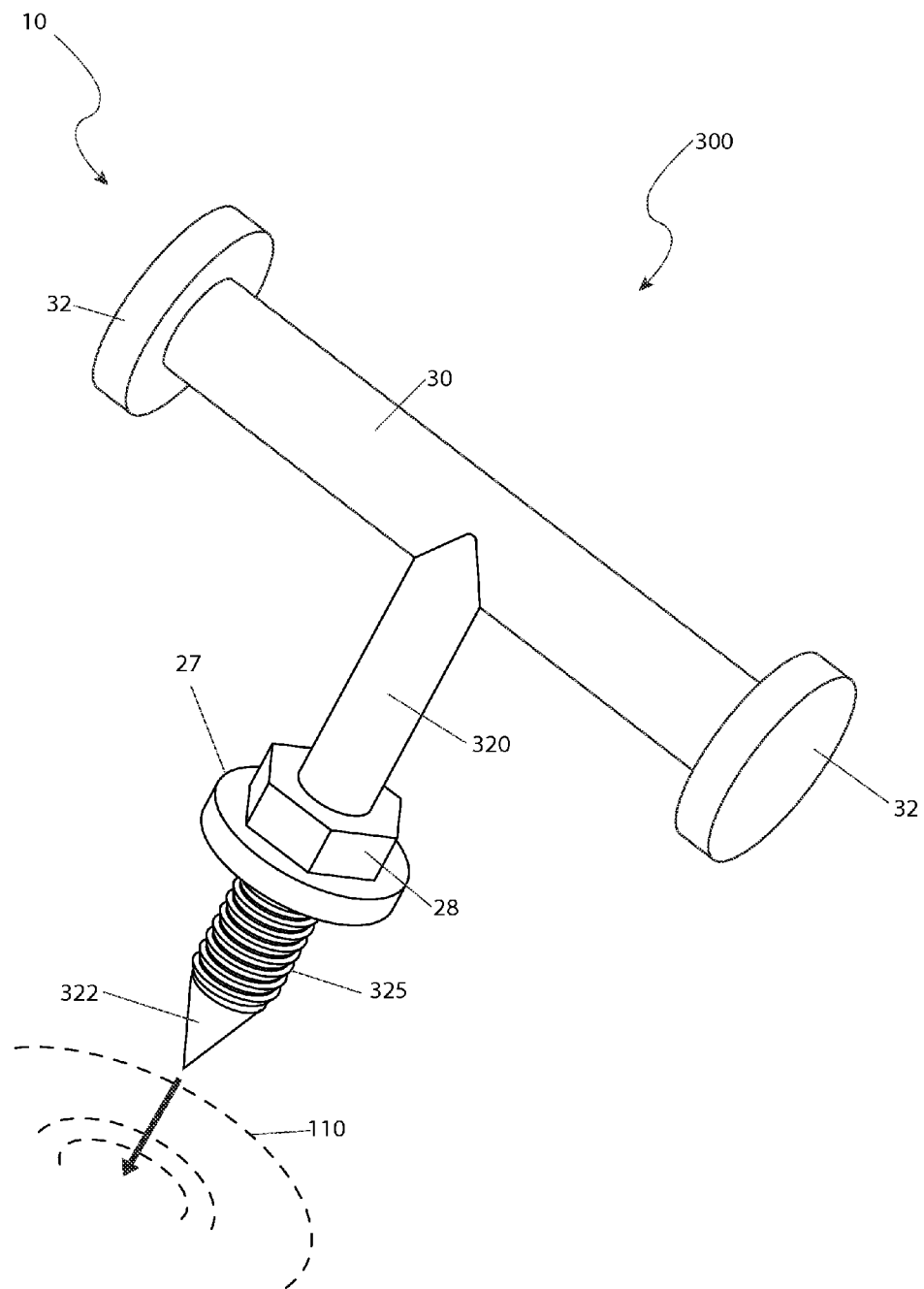

The best mode for carrying out the invention is presented in terms of its preferred embodiment, herein depicted within FIGS. 1 and 2, and in terms of alternate embodiments, herein depicted within FIGS. 3 and 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an equipotential grounding device (herein described as the "device") 10, which provides a means for field applied attachment by a lineman for equipotential grounding work in the high-voltage industry. The device 10 would preferably be installed below a line worker's feet and used to attach grounding/bonding lines 105, nets, structures, and other similar devices which provide multiple equipotential surfaces to protect high-voltage workers. A plurality of embodiments 10, 200, 300 are described herein which provide an attachment means to varying surfaces on existing electrical power structures such as towers, buildings, power poles 100, and wooden poles 110.

Referring now to FIG. 1, an environmental view of the device 10 depicting installation upon a power pole 100, according to the preferred embodiment of the present invention, is disclosed. The device 10 includes a shaft 20 having an integral tee-shaft 30 which extends perpendicularly from one (1) end, and a male threaded region 25 at an opposite end. The shaft 20 is illustrated here being inserted through opposing drilled or formed apertures 102 through an existing hollow metal power pole 100. The existing power pole 100 is envisioned being previously prepared with the apertures 102 so as to insertingly receive the shaft portion 20 of the device 10. The shaft 20 is inserted through the apertures 102 and secured to the power pole 100 via engagement of a nut fastener 26 upon the protruding male threaded region 25 of the shaft 20. The shaft 20 also provides integral portions located approximately six inches (6 in.) from the tee-shaft 30 including a shaft stop 27 and a plurality of wrench flats 28. The shaft stop 27 provides a perpendicularly extending surface having a shape similar to a disc, or the like, which acts as a mechanical limitation as the shaft 20 is inserted into the power pole 100. The wrench flats 28 may also utilize an integral nut fastener, or similar form, enabling a user to stabilize the device 10 during installation of a nut fastener 26 upon the male threaded region 25. A user may utilize tool such as wrenches upon the wrench flats 28 and nut fastener 26 to tighten and secure the device 10 to the power pole 100. The device 10 would then be ready for attachment of grounding/bonding lines 105 or similar safety equipment.

Referring now to FIG. 2, a perspective view of the device 10, according to a preferred embodiment of the present invention, is disclosed. The shaft 20 and tee-shaft 30 portions are envisioned to be welded together at right angles and made using a copper-coated steel rod material to maximize conductivity. The shaft 20 and tee-shaft 30 portions are envisioned to be introduced in various diameters such as, but not limited to: five-eighths of an inch (⅝ in.), three-quarters of an inch (¾ in.), and seven-eighths of an inch (⅞ in.). The shaft 20 is envisioned to be introduced in various lengths which correspond to different diametrical sizes of metal power poles 100, as indicated by dimension 'd' 22, such as, but not limited to: one inch (1 in.), two inches (2 in.), ten inches (10 in.), twelve inches (12 in.), fourteen inches (14 in.), sixteen inches (16 in.), eighteen inches (18 in.), twenty inches (20 in.), twenty-two inches (22 in.), twenty-four inches (24 in.), and twenty-six inches (26 in.). The tee-shaft 30 is attached at its center point to the end of the shaft 20. The tee-shaft 30 is envisioned to provide integral disc-shaped attachment keepers 32 at both end portions which extend perpendicularly outward and aid to safely retain the grounding/bonding lines 105 attached thereto, as well as provide a smooth and safe appendage to avoid possible impact injuries to linemen.

The device 10 provides a low cost design which may remain upon the power pole 100 after maintenance or repair work has been completed, if desired, and used again at a future time. The features of the device 10 ensure that all surfaces are at ground potential to ensure safety as well as providing for the temporary bonding of power lines being worked on to avoid induced currents.

Referring now to FIG. 3, a perspective view of a first alternate embodiment 200 of the present invention, is disclosed. The first alternate embodiment 200 includes a first alternate shaft 220 and a tee-shaft 30. The first alternate shaft 220 is adapted for attachment to an existing male threaded fastener 103 having been previously installed upon the existing metal power pole 100 or similar structure. The first alternate shaft 220 provides integral portions including a female threaded region 227 formed within an end portion opposite the tee-shaft 30. The first alternate shaft 220 also includes a plurality of wrench flats 28 to aid in tightening of the female threaded region 227 upon the existing male threaded fastener 103 using a tool such as a wrench.

Referring now to FIG. 4, a perspective view of a second alternate embodiment 300 of the present invention, is disclosed. The second alternate embodiment 300 is particularly designed for installation upon a wooden-type power pole 110 via penetration of a pointed spike end portion 322 into a wooden pole 110. The spike end 322 is located opposite the tee-shaft 30. It is further envisioned that a user would provide a necessary number of striking blows, using a hammer or similar tool, against the tee-shaft 30 so as to drive the spike end 322 into a top center portion of the wood-type power pole 110, thereby utilizing moisture contained within a core portion of the wooden pole 110 as a grounding path. Adjacent to the spike end 322 is an alternate male threaded region 325. The alternate male threaded region 325 is envisioned to provide a coarse thread to aid in rotation and removal of the second alternate embodiment 300 from the wooden power pole 110, when necessary. Additionally, the second alternate embodiment 300 includes wrench flats 28 and a shaft stop 27, also to aid in removal. The spike end 322 and alternate male threaded region 325 portions are envisioned to be approximately one-half inch (½ in.) in diameter and provide a combined length of approximately four inches (4 in.).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of installing and utilizing the device 10 may be achieved by performing the following steps: procuring a model of the device 10 having a particular length shaft 20 (dimension 'd' 22), which corresponds to an outside diameter of a power pole 100 onto which the device 10 is to be installed; preparing the power pole 110 for installation of the device 10 by drilling opposing apertures 102 through, if not previously modified; inserting the shaft 20 through the apertures 102 until the shaft stop 27 contacts the outer surface of the power pole 100; orientating the tee-shaft 30 horizontally or vertically, as desired; engaging the wrench flats 28 with a wrench or similar tool; threading and tightening a nut fastener 26 into a protruding male threaded region portion 25 of the shaft 20 using a wrench or similar tool; attaching grounding/bonding lines 105, nets, structures, and other safety devices to the shaft 20 and tee-shaft 30 portions of the device 10, as needed; removing the device 10 from the power pole 100 following a service task, if desired, by removing the nut fastener portion 26 and removing the shaft portion 20 of the device 10 from the aperture portions 102 of the power pole 100; and, benefiting from available areas for equipotential connection by lineman for protection from possible induced currents, afforded a user of the present invention 10.

The method of installing and utilizing the first alternate embodiment 200 may be achieved by performing the following steps: preparing an existing power pole 100 to attach the first alternate embodiment 200, if not previously modified, by welding or otherwise installing a male threaded fastener 103 at a location upon the power pole 100 being convenient for connection thereto by a working lineman; attaching the first alternate embodiment 200 by threadingly engaging a female threaded region portion 227 onto the aforementioned male threaded fastener 103; tightening the first alternate embodiment 200 using the wrench flats 28 and a tool such as a wrench; utilizing the portions of the alternate embodiment 200 for attachment of grounding/bonding lines 105, nets, structures, and other similar safety devices; removing the first alternate embodiment 200 from the power pole 100, if desired, by engaging the wrench flats 28 using a tool such as a wrench; and, rotating and removing the female threaded region portion 227 from the male threaded fastener 103.

The method of installing and utilizing the second alternate embodiment 300 may be achieved by performing the following steps: positioning the spike end portion 322 of the second alternate embodiment 300 against a top center portion of a wood-type power pole 110; providing a necessary number of striking blows against the tee-shaft portion 30 of the second alternate embodiment 300 using a hammer or similar tool until the shaft stop 27 contacts the wooden pole 110; utilizing moisture contained within the wooden pole 110 to act as a grounding path to the second alternate embodiment 300; and, using the wrench flats 28 and alternate male threaded region 325 portions to aid in rotation and removal of the second alternate embodiment 300 from the wooden pole 110 using a tool such as a wrench, if desired. The apparatus 10 may also be used within a user's home, during travel within a motor vehicle, while on vacation, camping, or similar ventures away from home.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A tool, comprising:
   a shaft; having:
   a first end;
   a tee-shaft attached at a center to said first end and extending perpendicularly therefrom; and,
   an attachment region at a second end opposite said first end;
   a shaft stop located at and circumscribing an outer diameter of said shaft at an intermediate position; and,
   a plurality of first flat features circumscribing said outer diameter of said shaft between said shaft stop and said tee-shaft;
   wherein said attachment region is configured to removably receive a fastening feature.

2. The tool of claim 1, wherein said tee-shaft is an integral portion of said shaft.

3. The tool of claim 2, wherein said tee-shaft further comprises integral disc-shaped attachment keepers at both distal ends, each extending perpendicularly outward therefrom;
   wherein said attachment keepers are adapted to safely retain grounding lines thereto.

4. The tool of claim 2, wherein said tee-shaft further comprises integral disc-shaped attachment keepers at both distal ends, each extending perpendicularly outward therefrom;
   wherein said attachment keepers are adapted to safely retain bonding lines thereto.

5. The tool of claim 1, wherein said attachment region is a male threaded fastener.

6. The tool of claim 1, wherein said attachment region is a female threaded fastener and a plurality of second flat features.

7. A tool, comprising:
   a shaft, having:
   a first end;
   a tee-shaft attached at a center to said first end and extending perpendicularly therefrom;
   a second end terminating in a point opposite said first end; and,
   an attachment region adjacent to said second end;
   a shaft stop located at and circumscribing an outer diameter of said shaft at an intermediate position; and,
   a plurality of flat features circumscribing said outer diameter of said shaft between said shaft stop and said tee-shaft;
   wherein said attachment region is configured to removably receive a fastening feature.

8. The tool of claim 7, wherein said tee-shaft is an integral portion of said shaft.

9. The tool of claim 8, wherein said tee-shaft further comprises integral disc-shaped attachment keepers at both distal ends, each extending perpendicularly outward therefrom;
   wherein said attachment keepers are adapted to safely retain grounding lines thereto.

10. The tool of claim 8, wherein said tee-shaft further comprises integral disc-shaped attachment keepers at both distal ends, each extending perpendicularly outward therefrom;
    wherein said attachment keepers are adapted to safely retain bonding lines thereto.

11. The tool of claim 7, wherein said attachment region is a male threaded fastener.

12. A tool, comprising:
    a shaft, having:
    a first end;
    a tee-shaft attached at a center to said first end and extending perpendicularly therefrom;
    a second end terminating in a point opposite said first end; and,
    an attachment region adjacent to said second end;

a shaft stop located at and circumscribing an outer diameter of said shaft at an intermediate position; and, a plurality of flat features circumscribing said outer diameter of said shaft between said shaft stop and said tee-shaft;

wherein said attachment region is configured to removably receive a fastening feature.

13. The tool of claim 12, wherein said tee-shaft is an integral portion of said shaft.

14. The tool of claim 13 wherein said tee-shaft further comprises integral disc-shaped attachment keepers at both distal ends, each extending perpendicularly outward therefrom;

wherein said attachment keepers are adapted to safely retain grounding lines thereto.

15. The tool of claim 13, wherein said tee-shaft further comprises integral disc-shaped attachment keepers at both distal ends extend perpendicularly outward therefrom;

wherein said attachment keepers are adapted to safely retain bonding lines thereto.

16. The tool of claim 12, wherein said attachment region is a spiked end having a male threaded region.

* * * * *